United States Patent

[11] 3,581,615

| [72] | Inventors | Kenichi Kaneshige;<br>Yasuyuki Nagae, both of Osaka-Prefecture, Japan |
|---|---|---|
| [21] | Appl. No. | 871,651 |
| [22] | Filed | Nov. 13, 1969 |
| [45] | Patented | June 1, 1971 |
| [73] | Assignee | Central Glass Co. Ltd., Ube Yamaguchi-Prefecture, Japan<br>Continuation of application Ser. No. 715,899, Mar. 25, 1968, now abandoned. |

[54] APPARATUS FOR AUTOMATICALLY CUTTING A GLASS RIBBON
14 Claims, 3 Drawing Figs.

[52] U.S. Cl. .................................................... 83/295,
83/6, 83/369
[51] Int. Cl. ..................................................... B26d 1/56,
B26d 3/08
[50] Field of Search............................................ 83/6—12,
295, 369; 225/96.5

[56] References Cited
UNITED STATES PATENTS

| 3,244,337 | 4/1966 | Curtze........................... | 83/7X |
| 3,282,140 | 11/1966 | Sasabuchi et al. ............ | 83/7 |
| 3,424,357 | 1/1969 | Curtze........................... | 225/96.5X |
| 3,439,849 | 4/1969 | Matsuzaki et al............. | 83/10X |

*Primary Examiner*—James M. Meister
*Attorneys*—Ralph E. Bucknam, Jesse D. Reingold, Robert R. Strack and Henry A. Maizulla, Jr.

ABSTRACT: The present invention relates to an apparatus for automatically cutting transversely a continuously moving glass ribbon in a direction perpendicular to the direction of its moving pathway, which comprises a guide rail bridged across and above the glass ribbon in a direction oblique to the advancing pathway, and a cutter guided along said guide rail, characterized in that an advancing speed of the glass ribbon is electrically detected, and said cutter is driven to travel proportionally to said advancing speed so as to automatically cut said glass ribbon to predetermined lengths.

PATENTED JUN 1 1971
3,581,615
SHEET 1 OF 2
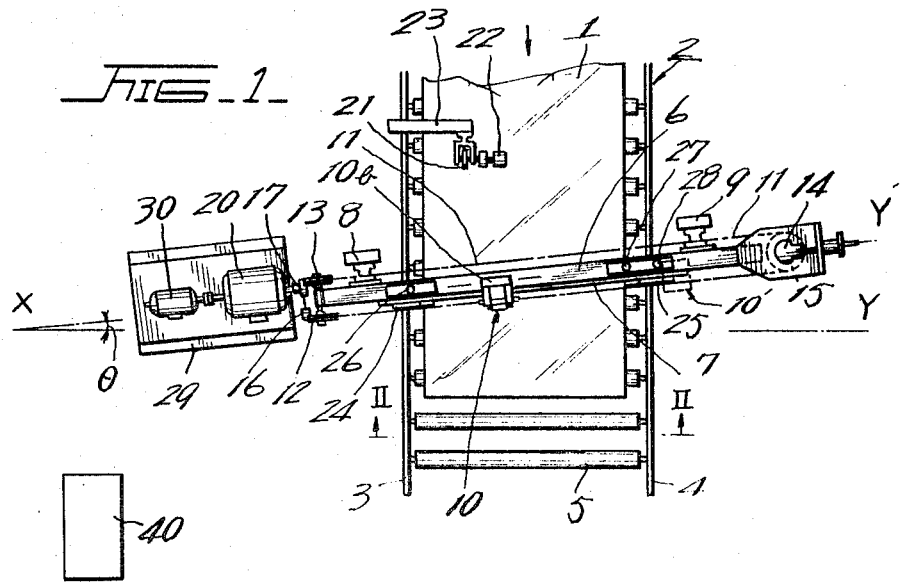
FIG_1_
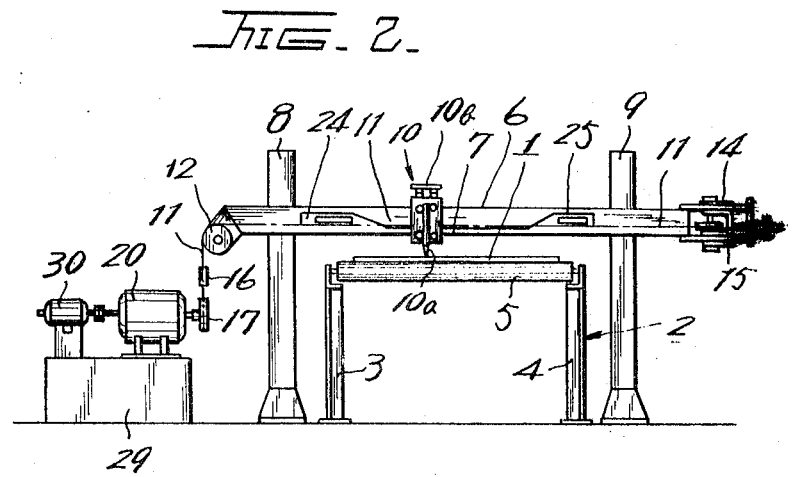
FIG_2_
INVENTORS.
KENICHI KANESHIGE
BY YASUYUKI NAGAE
ATTORNEY

APPARATUS FOR AUTOMATICALLY CUTTING A GLASS RIBBON

This application is a continuation of application Ser. No. 715,899, filed Mar. 25, 1968, now abandoned.

BACKGROUND OF THE INVENTION

In manufacturing a sheet glass, a glass ribbon in the form of continuous ribbon from molten glass material is taken out through a number of molding rollers with a given width and thickness, subsequently said glass ribbon, which carried through the conveyor rollers, is subjected to an appropriate annealing, and finally said ribbon is supplied into an apparatus adapted to cut the ribbon to a predetermined length wherein said glass ribbon is transversely cut at definite intervals in a direction perpendicular to the direction of its moving pathway so as to obtain glass sheets of a desired length. There have been proposed various automatic systems and devices for cutting transversely the glass ribbon in a direction perpendicular to the direction of its pathway, which ribbon is advancing through the conveyor rollers. However, the automatic cutting apparatus which may fulfill a high advancing speed of the glass ribbon and may also improve accuracy of the size of the obtained glass sheets have not yet been proposed.

As one of the most preferable glass-cutting apparatus which have already been proposed, a cutting device utilizing a digital control system for traversely cutting a glass ribbon has been proposed, in which a guide rail is bridged across and above a roller conveyor in a direction oblique to the advancing pathway of the glass ribbon at an inclination angle $\theta$ and a speed $V$ of a cutter running along said guide rail is controlled so as to keep the relationship shown by a formula of $V \times v/\sin\theta$ to an advancing speed $v$ of said glass ribbon. The cutting means in such digital control system consists of a speed-detecting pulse generator, a preset counter and an oil-pressure-operated pulse motor, in which said pulse generator is adapted to detect the advancing speed of the glass ribbon by a wheel rotating in contact with said ribbon and also to convert the speed into a pulse signal, said preset counter is operated to integrate said pulse signal and to generate a cut-starting signal and the oil-pressure-operated pulse motor is driven to start by said cut-starting signal and is also driven to rotate by means of said pulse signal from the pulse generator, so constituted that the aforementioned cutting means is driven with the speed as shown by the formula of $V \times v/\sin\theta$ by the pulse motor to cut said glass ribbon, after which said pulse motor is controlled by a pulse count setting circuit set in the present counter so as to return said cutting means to its original position. The advancing speed (pulse count) of the glass ribbon is detected as the pulse signal from the pulse generator of the cutting means, while said pulse generator is driven by a rotating wheel rotating in contact with the glass ribbon, thus causing error due to slipping at the contact portions between the ribbon and the rotating wheel as well as by abrasion and distortion of said wheel, and also causing the dimensional error in the traverse cutting intervals of the glass ribbon. According to the abovementioned device, a mechanical adjusting means for removing the foregoing difficulties has been proposed, so that it becomes considerably inconvenient to operate said means and it is also remarkably difficult to effect accuracy therefor. In addition, for driving a cutter, the oil-pressure-operated pulse motor is necessarily provided in the device employing the digital control system so that it is difficult to carry out maintenance and adjustment, while the pulse motor of both high efficiency and high price can not be easily manufactured and such being the case, said pulse motor has not been advisable as a driving means of the cutter.

It has also been impossible to immediately detect whether the travelling cutter has resulted in the cutting surface in a direction perpendicular to the advancing pathway of the glass ribbon after completion of the travelling of the cutter. Normally, it is necessary to actually measure the dimensions of each sheet glass after the cutting process for the purpose of determining whether the cutting surface is at right angles to the longitudinal direction of the ribbon. Consequently, a considerable amount of the thus obtained sheet glass products have resulted in the great loss.

SUMMARY OF THE INVENTION

A principal object of this invention is to provide an apparatus for automatically cutting a glass ribbon through an analogue control system, in which the advancing speed of the glass ribbon is detected as a pulse signal, said signal is converted into an analogue value, and start of rotation, rotational speed, reverse rotation as well as the stopping of a DC motor for driving a cutter are controlled by means of said analogue value so as to transversely cut the glass ribbon to a given length with a high efficiency.

Another object of this invention is to provide an apparatus for automatically cutting a glass ribbon through an analogue control system, in which the error of the cutting length caused by the slip or abrasion of a speed-detecting roller rotating in contact with said glass ribbon usually employed in such an apparatus caused by lack in the smoothness of a cutter-driving means can be easily adjusted with an extremely high efficiency by means of an electrical adjusting means, not by the conventional mechanical adjusting means.

A further object of this invention is to provide an apparatus for automatically cutting a glass ribbon through an analogue control system, in which a DC motor having a simple construction is used for driving the cutter so that the motor may be easily maintained and adjusted free of an adverse effect on said motor.

Still another object of this invention is to provide an apparatus for automatically cutting a glass ribbon through an analogue control system, wherein the current wave form of a DC motor at a set point can be always kept to the desired one so as to remove the deviation of the cutting sizes due to variation in the starting current.

Still another object of this invention is to provide an apparatus for automatically cutting a glass ribbon through an analogue control system, wherein the advancing speed of the cutter can be easily adjusted in proportion to the advancing speed of the glass ribbon and after cutting, said cutter can be accurately returned back to the original position with a speed faster than the cutting speed of said cutter.

A further more object of this invention is to provide an apparatus for automatically cutting a glass ribbon through an analogue control system, wherein the starting of rotation, reverse rotation as well as stopping of reverse rotation of a DC motor can be controlled with a desirably faster responsive speed.

Finally, another object of this invention is to provide an apparatus for automatically cutting a glass ribbon through an analogue control system, wherein there is provided a device for detecting whether the cutting face of the glass ribbon has been cut by the travelling cutter in a direction perpendicular to the advancing pathway of said ribbon immediately after said cutter has stopped.

In accordance with the present invention, the apparatus for automatically cutting a glass ribbon through an analogue control system which comprises a roller conveyor which advances a glass ribbon formed continuously from a molten glass mass; a guide rail bridged across and above said roller conveyor in a direction oblique to the advancing pathway of the glass ribbon; a cutter slidably mounted on said guide rail; a pulse signal generator for detecting the advancing speed and advancing distance of the glass ribbon; a DC motor and its control device for driving the cutter so as to move said cutter in proportion to the advancing speed of the glass ribbon to transversely cut the glass ribbon and also reversely travel said cutter to its original position after the completion of cutting the glass ribbon; a digital analogue circuit including a frequency counter for sampling the pulse signal detected through the pulse signal generator in proportion to the advancing speed of the glass ribbon, and a converter for converting an output of the frequency counter into a direct current voltage; a control circuit of a DC motor involving amplifiers for amplifying the signal voltage, two igniting phase control circuits for receiving the output of these amplifiers and two thyristors set in an AC supplying circuit of the DC motor in such a manner that said AC supplying circuit is conducted when the gates of said thyristors are fed gate signals emitted from these igniting phase control circuits; a cutter travelling control means provided with a preset counter for integrating the pulse signal detected by the pulse signal generator to produce a cut-starting signal at the output whereby the output voltage of said digital analogue converting circuit is applied to said control circuit of the DC motor to normally drive the DC motor; and a cutter-returning control means including a plurality of switching means for successively transmitting instruction signals in accordance to travel the cutter together with the guide rail, which switching means are so functioned as to apply the signal voltage by said instruction signals for the reverse rotation, reduction of the reverse rotational speed or stopping of the DC motor whereby the cutter is quickly returned back to the original position of the guide rail.

The cutting means of the present invention is so constructed that during the cutting operation of the glass ribbon, a pulse signal detected in response to the advancing speed of said ribbon is converted into an analogue value, which is amplified as a positive signal voltage by a DC amplifier through a relay contact actuated by a cut-starting signal delivered from the preset counter, then its output signal voltage transmits a gate signal from one (for the normal rotation) of the two igniting phase control circuits to a gate of one (for the normal rotation) of the two sets of thyristors set in the supplying circuit so that the DC motor for driving the cutter is actuated to rotate in the normal direction so as to cut said glass ribbon. The advancing speed $V$ of the cutter should be always kept to the relationship shown by the formula of $V \times v/\sin\theta$ to the advancing speed $v$ of the glass ribbon. A low-ripple DC generator which functions as a rotary meter is directly connected to the rotary shaft of the DC motor for driving the cutter in order to detect the advancing speed of said cutter as a DC voltage, which is fed back to an input of the DC amplifier, resulting in that a normal signal voltage applied to the DC amplifier is fed back whereby the positive signal voltage to be applied to the DC amplifier may be previously adjusted so as to have a desired value. The thus adjusted voltage is applied to a phase shifter for normal or reverse rotation to control the igniting phase of a thyristor thereby to maintain the rotational speed of the DC motor and accordingly, the travelling speed of the cutter. According to this system, the control of rotational speed of the DC motor is effected by adjusting the magnitude of an analogue value or that of a positive signal voltage to be applied to the input of the DC amplifier, and accordingly, the travelling speed $V$ of the cutter can be set so as to satisfy the above-mentioned formula $V \times v/\sin\theta$.

Each time when a predetermined length sheet glass has been cut off the glass ribbon by the travelling cutter of the device of the present invention, simultaneously, a switch for the reverse rotation arranged at the guide rail is actuated to generate a reverse rotation signal, by which the relay contact for the normal rotation is opened to interrupt the normal signal voltage and at the same time, the relay contact for the reverse rotation is closed to apply a great negative signal voltage to the input of the DC amplifier from another DC power source. In consequence, a gate signal is transmitted to the other thyristor (for the reverse rotation) of the supplying circuit for the DC motor from the other (for the reverse rotation) of the two sets of the igniting phase control circuits so as to control the igniting phase of said thyristor, thus rapidly rotating the DC motor in the reverse direction to travel the cutter in the reverse direction as well. Then, as the cutter approaches the stopping position, a switch for reduction of the reverse rotational speed is driven to generate a signal for reduction of speed, by which the relay contact for the reverse rotation is opened to interrupt the great negative signal voltage and simultaneously, the relay contact for reduction is closed to apply a small negative signal voltage to the input of the DC amplifier from the DC power source. A gate signal having a phase shift angle responsive to the small negative signal voltage is applied to the gate of the thyristor for the reverse rotation from the igniting phase control circuit for the reverse rotation so that the reverse rotational speed of the DC motor is substantially reduced to approach the cutter to the stopping position with a low speed. When the cutter is shifted to the stopping position, a stopping switch is actuated to generate a signal for stopping the DC motor, by which the relay contact for reduction is opened to interrupt the negative signal voltage which has been applied to the input of the DC amplifier, thus stopping the reverse rotation of the DC motor and returning the cutter to the original position. In this case, the advancing speed of the cutter shifting in the reverse direction is adjusted by the negative signal voltage applied to the relay contact for the reverse rotation from the other DC voltage. According to this system, the returning speed of the cutter can be easily set to the desired one rather than the ordinary device by the digital control systems, and the speed of the cutter travelling in the reverse direction can be easily reduced near the stopping position so that the cutter can be returned back to the original position with an extremely high accuracy. This system is also useful for smoothly cutting the glass ribbon with the narrow intervals.

In accordance with the apparatus of this invention, the start of rotation, reverse rotation, reduction of the reverse rotational speed as well as stopping of rotation can be controlled with a preferably high responsive speed and accuracy so that under the condition that either positive or negative signal voltage is not applied to the DC amplifier, either positive or negative constant DC voltage is applied independently of each DC power source to the two sets of the igniting phase control circuits set to the output of the DC amplifier. Accordingly, it is so constructed that the gate signal is applied independently of the two sets of the igniting phase control circuits to the two sets of the thyristors inserted in the supplying circuits of the DC motor, always enabling to keep said two sets of the thyristors in the conductive condition. In accordance with this process, when either positive or negative signal voltage is applied to the input of the DC amplifier, either one or the other of the two sets of said thyristors is actuated without any delay, thus rapidly supplying the DC motor with the direct current necessary for rotating said motor in either normal or reverse direction. Consequently, the rotation, reverse rotation, reduction of the reverse rotational speed as well as stopping of rotation of said DC motor can be controlled with an extremely fast responsive speed so that the starting of the travelling and returning of said cutter to the original position may be quite accurately carried out.

We have found out that when the starting current is not constant at the starting of the DC motor, the starting of the travelling of said cutter is unstable, resulting in variation in the size of the cut glass sheet to be obtained. In addition to either positive or negative signal voltage applied to the input of the DC amplifier, i.e. to the input of an operational amplifier of the DC amplifier of this invention, a correcting signal is transmitted at a set point of the input of said operational amplifier so that the signal voltage at the set point may be always kept to the desired value. Consequently, the starting current of the DC motor can be maintained at the constant waveform so that the running of the cutter may be always started accurately in response to the cut-starting signal transmitted from the preset counter, thus enabling to cut glass sheets off the glass ribbon with a precise accuracy. According to the invention, there is provided a frequency counter for detecting whether the glass ribbon has been cut in a direction perpendicular to the direction of the moving pathway of said glass ribbon. By means of this frequency counter, it is possible to detect whether the glass ribbon has correctly cut as soon as the cutter has finished its running operation. For controlling the cutting operation, such a right-angle detecting means is so useful as to produce said sheet glass with a predetermined size on a large scale.

In order to enable the present invention to be more readily understood, reference is now made by way of example to the accompanying drawings.

BRIEF DESCRIPTION OF THE DRAWINGS

FIG. 1 is a plan view of an apparatus for automatically cutting a glass ribbon of the present invention, partially showing a mechanical portion thereof;

FIG. 2 is a side elevation view of the mechanical portion, as viewed along the line II–II of FIG. 1.

PREFERRED EMBODIMENTS OF THE INVENTION

Figure 3:
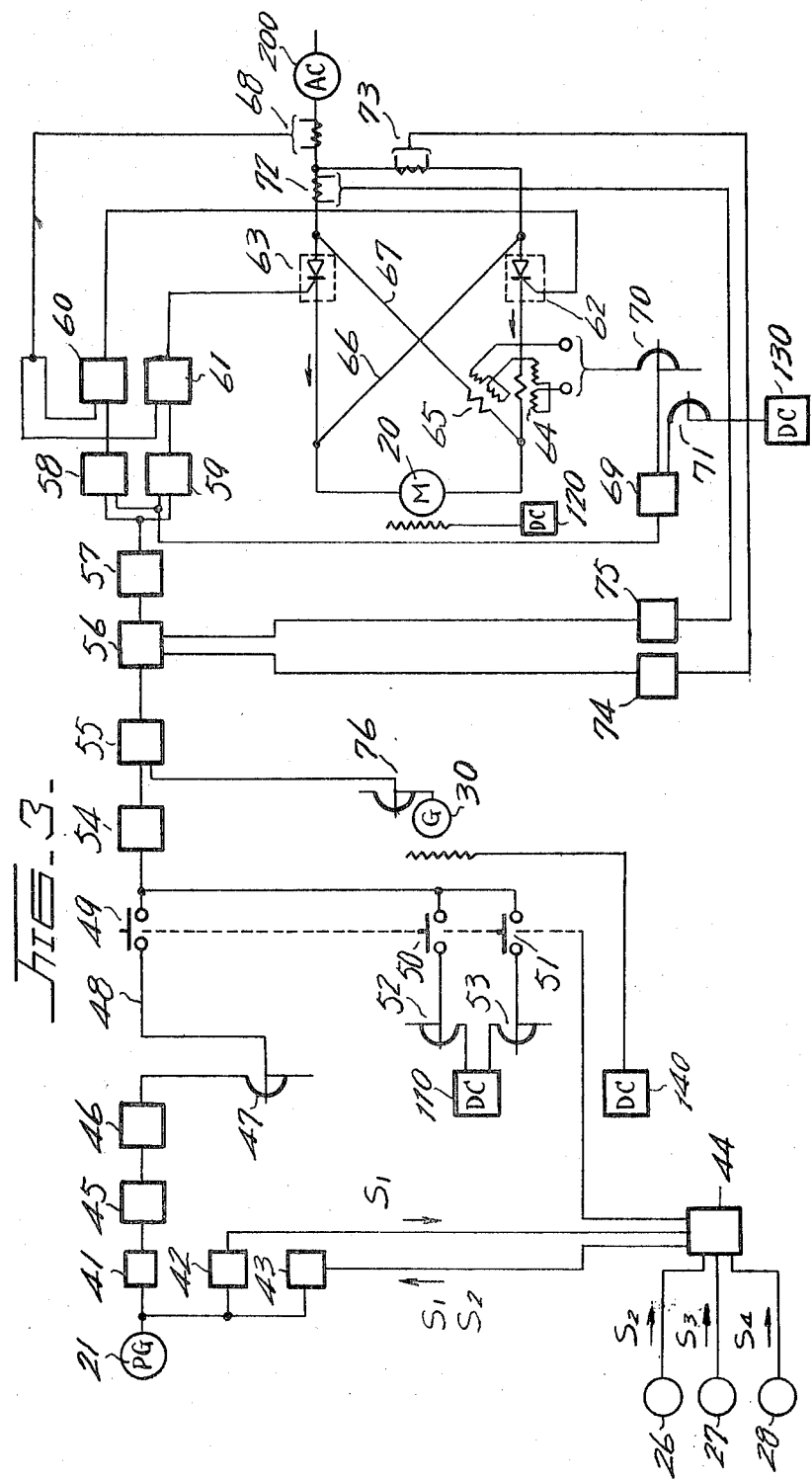
FIG. 3 is a block diagram showing the formation of an analogue control circuit for electrically controlling the present cutting apparatus.

Referring to FIGS. 1 and 2, a plurality of rollers 5 are rotatably mounted between conveyors 2 and 2 which are arranged on supporting stands 3 and 4 parallel to one another. A glass ribbon 1 withdrawn continuously from the molten glass mass with a given width and thickness is conveyed or carried forward in the direction as shown by an arrow. A guide rail 7 is bridged in a direction oblique to the direction of travelling pathway of the glass ribbon across and above the conveyor rollers 2 and 2. A cutter holder (not shown) is provided on the guide rail 7 so as to be able to move or displace freely said guide rail 7, and a cutter 10 is attached to said cutter holder so as to be able to come to contact or out of the glass ribbon 1. A traverse frame 6 for supporting the guide rail is mounted on a pair of supporting stands 8 and 9 adjacent to the supporting stands 3 and 4 in a manner that the height of these stands 8 and 9 may be adjusted, and moreover, one of these supporting stands 8 and 9 is located at an advanced position than that of the other in the direction of the travelling pathway of the glass ribbon 1, and in the preferable embodiment of this invention, the inclination angle $\theta$ subtended by the axis X–Y' of the guide rail 7 oblique to the axis X–Y of the direction of the travelling pathway of the glass ribbon is selected to about 6°. A part of the cutter 10 is connected to a proper portion of an endless belt 11 which is tensionally provided around a pair of guide wheels arranged at one end of the traverse frame 6 and also around a guide wheel 15 of a tension means 14 disposed at the other end of said traverse frame 6. The endless belt 11 is engaged by a sheave 17 secured to a rotating shaft of a DC motor 17 through a sheave 16.

For driving the DC motor 20, an analogue control circuit 40 is actuated in such a manner that the advancing speed of the glass ribbon 1 is detected as a pulse signal emitted from a pulse signal generator 21, said pulse signal is applied for integration to a preset counter 42 shown in FIG. 3 and said preset counter 42 is adapted to generate a cut-starting signal $S_1$. The pulse generator 21 is joined to a roller or wheel 22 for detecting the advancing speed and the outer peripheral portion of the wheel 2 made of the friction-resistant material such as hard rubber is in contact with the glass ribbon 1 by way of a supporting member 23, and it is so constituted to generate a pulse signal in response to the advancing speed of the glass ribbon 1. According to the preferable embodiment of the present invention, use is made of a photocell-type pulse generator, which is adapted to generate an electrical signal of about 3,000 pulses through one rotation of the wheel 22 and 600 pulses per 1 inch of the advancing distance of said glass ribbon 1.

Under the condition that the cut-starting signal $S_1$ is not applied from the preset counter 42 to the analogue control circuit 40, the DC motor 20 does not rotate and the cutter 10 always stops at a position 10 at the right end portion of the guide rail 7 shown by the broken line in FIG. 1. When the cut-starting signal $S_1$ is applied to the analogue control circuit 40 from the preset counter 42, the DC motor 20 is driven for driving the endless belt 11. In consequence, the cutter 10 is driven to run leftward along the guide rail 7 from the broken line portion 10' into the direction shown by the full line arrow with a predetermined speed so as to cut the glass ribbon 1. After the completion of cutting the glass ribbon 1 by the cutter 10, lever (not shown) of the cutter 10 is caused to contact a cam plate 24 secured to the supporting member 6 to lift a knife edge 10a of the cutter 10, a switch 20 for reverse rotation is actuated by a magnetic actuating plate 10b attached to the cutter 10 in order to rotate the DC motor 20 in the reverse direction and the cutter 10 is driven to run rightward as shown by the dotted arrow. When the cutter 10 approaches the stopping position 10', a switch 27 is actuated by the actuating plate 10b so as to reduce the reverse rotational speed of said cutter 10. Subsequently, when the cutter 10 arrives at the stopping position 10', a switch 28 for stopping is actuated by the actuating plate 10b to stop the rotation of the motor 20, the cutter is returned back to the normal position, the lever (not shown) of said cutter 10 is made into contact with a cam plate 25 secured to the supporting member 6 so as to project the knife edge 10a downward and the cutter 10 is maintained in the condition ready for starting a next cycle of cutting operation.

In the preferable embodiment of this invention, use is made of these switching means 26, 27 and 28 for a LC resonator, and when the magnetic actuating plate 10b provided with the cutter approaches these switching means, a frequency of the LC resonator varies, and it is so constructed that a relay means (to be explained later) is actuated by means for detecting the variation through a transistor circuit.

Moreover, a low-ripple DC generator 30 functioning as a rotary meter is directly coupled to a rotating shaft of the motor 20 for driving the cutter 10 to compensate the advancing speed of said cutter, both of the motor 20 and generator 30 being disposed on a mount 29.

In FIG. 3, there is shown a block diagram explaining formation of the analogue control circuit of the present invention, wherein the pulse signal emitted from the pulse generator 21 in response to the advancing speed of the glass ribbon 1 is converted into an analogue value, by which the DC motor 20 for driving the cutter 10 can be driven so as to control the rotating speed, starting of driving, reverse rotation and stopping of rotation of said motor, respectively. In the block diagram shown in FIG. 3, the pulse generator 21, the DC motor 20 and the low-ripple DC generator 30 functioning as a rotary meter are indicated by the same reference numerals as in FIG. 1, the instruction signals from a switch 26 for reverse rotation, a switch 27 for reduction of the reverse rotational speed and a switch 28 for stopping feed a reverse rotating signal $S_2$, a reduction signal $S_3$ and a stopping signal $S_4$, respectively.

The pulse signal detected by the pulse signal generator 21 in response to the advancing speed of the glass ribbon is applied to a frequency counter 42 for detecting the right angles of the cutting surface of the glass ribbon. The pulse signal sampled through the frequency counter 41 is applied to a digital analogue converter 45 and converted into the analogue value. According to the present invention, the sampling time is 50m/s, while the interval time is 0.1m/s. The signal voltage converted into the analogue value through the digital analogue converter is subjected to direct current amplification by a chopper amplifier 46 and integrated, then adjusted to a value suitable for a variable resistor 47 and applied to a line 48 as a positive signal voltage.

The preset counter 42 is operated to count the pulse signal thus added, while as soon as the counted pulse count becomes the one corresponding to the cutting dimensions of the glass ribbon, the signal $S_1$ for starting the cutting operation is transmitted to a control circuit 44.

A relay contact 49 for the normal rotation of the motor 20 is connected in series in a line 48, while a relay contact 50 for reversely rotating the motor 20 and a relay contact 51 for reducing a reverse rotational speed of said motor are connected between an input of the contact 49 and a direct current source 110 through variable resistors 52 and 53, respectively.

As soon as the signal $S_1$ for starting the cutting operation from the preset counter 42 gets into the control circuit 44, an electric current is supplied from the control circuit 44 to an exciting relay coil of the relay contact 49, the positive signal voltage sent from the line 48 is applied to a control circuit to be explained later in order to rotate the motor 20 in the normal direction, for running the cutter, with the result that the cutting operation of the glass ribbon is started simultaneously. When the cutter is shifted to the switch 26 for reversely rotating after the completion of said cutting, the signal $S_2$ is transmitted from the switch 26 to the control circuit 44 to open the relay contact 49 for the normal rotation, an electric current is sent from said control circuit 44 to an exciting relay coil of a relay contact 50 for the reverse rotation to close the relay contact 50 and a great negative DC current is supplied by a negative signal voltage from the DC power source 110 to a chopper amplifier 54. Consequently, the DC motor 20 is driven to rotate reversely with a speed higher than that of the normal rotation so as to move said cutter into the reverse direction. As soon as the cutter 10 has been returned back to a reducing switch 27, the reducing signal $S_3$ is transmitted from said switch 27 to open the relay contact 50 for the reverse rotation, an electric current is fed from the control circuit 44 to an exciting reducing coil to close a contact 51 and a small negative DC voltage is applied as a negative voltage signal from the DC power source 110 to the chopper amplifier 54. To this end, the reverse rotation speed of the motor 20 is substantially reduced to travel the cutter with the reduced speed as well. When the cutter is shifted to a stopping switch 28, a stopping signal $S_4$ is sent to the control circuit 44 to open the reducing relay contact 51 and also to interrupt the negative signal voltage so that the rotation of the motor 20 is stopped and the cutter 10 is returned back to its original position. Then, as soon as the next cutting operation signal $S_1$ is transmitted from a preset counter 42 to the control circuit 44, the motor 20 is driven again to rotate in the normal direction, thus effecting the cutter 10 to make the cutting operation smoothly by its reciprocating movement along the guide rail. In the preferable embodiment of this invention, use is made of a quickly responsive mercury relay.

A frequency counter 43 for detecting whether the cutting surface of the glass ribbon has resulted in the direction perpendicular to the pathway of said glass ribbon is driven by means of a pulse signal transmitted from the control by an instruction signal circuit 44, said pulse signals fed within a time shown by the formula of $t_2-t_1$, wherein $t_1$ represents a set point for travelling the cutter by the cutting operation signal $S_1$ sent from the present counter 42 and $t_2$ represents a set point in which the reverse rotation signal $S_2$ is sent from the reverse rotation switch 21 after the completion of the cutting operation by the cutter during the normal operation of the cutter, the pulse count thus obtained represents approximately the constant value in accordance with the predetermined advancing speed of the cutter. Accordingly, in case the pulse count necessary for correctly cutting the glass ribbon at right angles to the longitudinal direction of the glass ribbon has been predeterminately set, it is possible to detect whether the glass ribbon has been correctly cut by means of the comparison of the pulse count with the pulse count obtained by the frequency counter 43, immediately after the cutter has finished travelling through the surface of the glass ribbon. It is also possible to combine an alarm or an error-detecting means with the frequency counter 43 to indicate whether the detection has resulted favorably.

The control circuit for automatically controlling the starting of cutting operation, rotation speed, reverse rotation, reduction of speed as well as stopping the rotation of the motor by closing the relay contacts 49, 50 and 51 is explained in detail in the following paragraph. The control circuit of this invention comprises the chopper amplifier 54 for amplifying either positive or negative signal voltage applied to the line 48, three operational amplifiers 55, 56 and 57 connected in series for amplifying the output from the chopper amplifier 54, a pair of operational amplifiers 58 and 59 for respectively amplifying positive and negative output signals sent from these operational amplifiers 58 and 59, and a pair of igniting phase control circuits 60 and 61 for controlling an igniting phase of a normal rotation thyristor 62 or a reverse rotation thyristor 63 set in the motor armature circuit by means of either positive or negative output signal voltage sent from these operational amplifiers 58 and 59.

In FIG. 3, these thyristors 62 and 63 are shown as one element, respectively, but in the embodiment of this invention, each of these thyristors consists of 12 thyristors for effecting full-wave rectification for a six-phase AC power source 200 so that a direct current of a preferably small ripple is applied to the DC motor 20. The aforementioned igniting phase control circuits 60 and 61 comprise 12 pulse-generating circuits which are adapted to transmit a signal to a gate of each of these 12 thyristors.

A field coil of the DC motor 20 is excited by the constant voltage sent from a DC power source 120. One terminal of an armature of the DC motor 20 is connected through a current transformer 64 for crosscurrent detection to a cathode of the thyristor 62, an anode of which is connected to the DC power source 200, while the other terminal of the armature of said motor 20 is connected to a cathode of the thyristor 63, an anode of which is connected to the DC power source. Moreover, the anode of the thyristor 62 is connected through a line 66 to the anode of the thyristor 63, while the anode of the thyristor 63 is connected intersectedly to the cathode of the thyristor 62 through a current transformer 65 for detecting a cross current inserted in a line 67. Each gate of these thyristors 62 an 63 is connected to the pulse-generating circuit of each of the igniting phase control circuits, respectively. AC input voltage is applied from the AC power source 200 to these igniting phase control circuits 60 and 61 through a phase current transformer 68 so that these igniting phase control circuits are synchronized with the applied voltages of the thyristors. When either positive or negative signal voltage is applied from each of the operational amplifiers 58 and 59 to either igniting phase control circuit 60 or 61, a gate signal of a phase angle coinciding with the value of the signal voltage is applied to a gate of each of thyristors 62 and 63 from either igniting phase control circuit 60 or 61. By the gate signal, these thyristors 62 and 63 are conducted so that either positive or negative direct current in proportion to the value of the signal voltage is given to the motor 20 so as to rotate said motor 20 either normally or reversely.

For the purpose of more rapidly reacting to the starting operation, the reverse rotation, the reduction of speed and the stopping of the rotation of the DC motor 20, it is so constituted in the apparatus of this invention that irrespective of the signal voltage applied to the operational amplifiers 58 and 59 from the line 48, either positive or negative direct current lower than the voltage signal is applied from another constant voltage DC power source 130 to these operational amplifiers 58 and 59 through an amplifier 69 for setting a crosscurrent, and the gate signal of the phase angle coinciding with the value of the DC voltage is applied to the gate of each of the thyristors 62 and 63 from each of the igniting phase control circuits 60 and 61 in order to keep these thyristors in the conductive state. To this end, a crosscurrent is always supplied to the lines 66 and 67, by which these thyristors are connected with each other so as to give no influence to the motor 20.

In the present invention, there are provided differentially connected two windings in these two current transformers 64 and 65 for detecting the crosscurrent, said two current transformers being connected in series. It is so constructed in the present invention that even when a great direct current substantially necessary for driving the motor 20 to rotate either in the normal or reverse direction is conducting through the thyristors 62 or 63, the crosscurrent can be easily detected. Under the conditions that these thyristors are always conducting a small electric current, that is, when the crosscurrent is conducting through the lines 66 and 67, the current transformers are not saturated to detect the crosscurrent. The crosscurrent is fed to a crosscurrent-setting amplifier 69, by which the crosscurrent is compared with a predetermined standard DC voltage supplied from a constant voltage DC power source 130 through a variable resistor 71 so as to amplify its differential voltage and to be applied to the operational amplifier 58 or 59, and it is so arranged that the crosscurrent conducting through the lines 66 and 67 is always kept to the given value of the current by which the controlling of the DC motor can be effected smoothly.

As already known a comparatively great starting current is conducting through the motor 20 for driving the cutter at the set point of said motor. When the starting current is not constant, the operation of the cutter travelling along the guide rail is either accelerated or reduced to cause error in the cutting dimensions of the glass sheet to be cut off.

In the apparatus of the present invention, current transformers 72 and 73 are provided respectively in the line for supplying alternating current from the AC power source 200 to the thyristors 62 and 63 in order to correct the above-mentioned error, the starting current at either normal or reverse rotation point of the motor 20 is detected, a starting current control circuit 74 for the normal rotation and a starting current control circuit 75 for the reverse rotation are actuated by the thus detected current, and a correcting signal obtained from each of these starting current control circuits is applied to an operational amplifier 56 so as to maintain the signal voltage at either normal or reverse rotation set point into the desired value, said signal voltage coming into an output of the operational amplifier 56. That is, when the positive signal voltage for the normal rotation or the negative signal voltage for the reverse rotation is applied by means of closing the relay contact 49 for the normal rotation or the relay contact 50 for the reverse rotation, the correcting signal is applied from either control circuit 74 or 75 to the operational amplifier 56, and either positive or negative signal voltage corrected to the desired value by the correcting signal is obtained at the output of the operational amplifier 56. While, a gate signal coinciding with the corrected signal voltage is applied to either thyristor 62 or 63 from the igniting phase control circuit 60 or 61 to conduct them, it is possible to maintain the starting current at either normal or reverse rotation set point of the motor 20 to a predetermined desired value.

In the apparatus of this invention, the low-ripple DC generator 30 functioning as a rotary meter is directly coupled to the DC motor 20, a field of which generator is supplied with a constant current from the constant voltage DC power source 140, a DC voltage induced in the DC generator 30 is detected as a value in proportion to the advancing speed of the cutter driven by the DC motor, said DC voltage is fed back through the variable resistor 76 to an input of the operational amplifier 55 to correct the signal voltage applied from the line 48 to the operational amplifier 55, and the signal voltage coinciding with the predetermined advancing speed of the cutter is applied to an output of said operational amplifier 56. Accordingly, the advancing speed of the cutter can be maintained at a constant value selected in proportion to the advancing speed of the glass ribbon detected by the pulse generator during the normal rotation of the DC generator or the cutting operation of the glass ribbon, thus substantially eliminating differences in the dimensions of glass sheets to be obtained.

While there is shown and described a present preferred embodiment of the invention it is to be distinctly understood that the invention is not limited thereto but may be otherwise embodied in different forms and practiced within the scope of the following claims.

What we claim is:

1. Apparatus for automatically cutting a glass ribbon comprising a conveyor which advances a continuous glass ribbon, a guide rail bridged across said conveyor, cutter means slidably mounted on said guide rail; a pulse signal generator for detecting the advancing speed of said glass ribbon; a DC motor for driving said cutter, and operable control means for said motor whereby the latter is operable to move said cutter in proportion to the advancing speed of said glass ribbon to transversely cut the glass ribbon and return said cutter to its original position after the completion of cutting each glass sheet off said glass ribbon, said operable control means comprising a digital analogue circuit including a frequency counter for sampling a pulse signal detected through said pulse signal generator in proportion to the advancing speed of said glass ribbon and a converter for converting an output of said frequency counter into a direct current voltage.

2. Apparatus according to claim 1 comprising a control circuit of a DC motor involving amplifiers for amplifying the signal voltage, two igniting phase control circuits for receiving outputs of said amplifiers and two thyristors provided in an AC supplying circuit of said DC motor in such a manner that said AC supplying circuit is conducted when the gates of said thyristors are fed with gate signals emitted from these igniting phase control circuits.

3. Apparatus according to claim 2 wherein said operable control means comprises a preset counter for integrating a pulse signal detected by said pulse signal generator to produce a cut-starting signal at the output whereby the output voltage of said digital analogue converting circuit is applied to said control circuit of the DC motor to normally drive said DC motor, and a cutter-returning control means including a plurality of switching means for successively transmitting instruction signals in accordance with the travel of said cutter together with the guide rail, said switching means being adapted to apply a signal voltage by said instruction signals for the reverse rotation, reduction of the reverse rotational speed or stopping of said DC motor whereby the cutter is quickly returned back to the original position of said guide rail.

4. An apparatus as set forth in claim 1 wherein said operable control means includes a relay contact for the normal rotation provided at the output of said digital analogue converting circuit and an operating circuit for supplying a control current to the exciting coil of said relay contact so as to close said relay contact by a cut-starting signal emitted from said preset counter.

5. Apparatus as set forth in claim 4 wherein an output signal from said digital analogue converting circuit is applied to the control circuit of said DC motor by closing the relay contact of said operable control means, both of the starting and rotation speeds of the DC motor being controlled so as to maintain the advancing speed of the cutter in a given proportion to the advancing speed of said glass ribbon and also to travel said cutter for transversely cutting the glass ribbon.

6. Apparatus as set forth in claim 3 in which said cutter-returning control means includes three switching means for transmitting each instruction signal successively in response to the travelling of said cutter slidably mounted on the guide rail, first and second relay contacts wherein one end of each of said relay contacts is connected to an output of said relay contact for the normal rotation and the other ends of said two relay contacts are connected respectively to said DC power source through variable resistors, and a relay control circuit for successively supplying a control current to the exciting coils of said relay contacts in such a manner that the relay contact for the normal rotation is opened by an instruction signal from said switching means and simultaneously said first relay contact closes, subsequently the relay contact is opened so as to close said second relay contact and finally the second contact is opened.

7. Apparatus as set forth in claim 6 in which said relay control circuit of the cutter-returning control means is actuated by means of closing said first relay contact so to apply said signal voltage from the DC power source to the control circuit of said DC motor thereby to reversely rotate said DC motor, said first relay contact being opened by closing said second relay contact so as to apply simultaneously another signal voltage from the DC power source to said control circuit of the DC motor thereby to reduce the reverse rotation speed of said motor, the rotation of said motor being effected so as to return the cutter to the original position by opening the second relay contact.

8. Apparatus as set forth in claim 3 wherein said operable control means comprises a control circuit for said DC motor including a plurality of operational amplifiers connected in series with each other, an operational amplifier for the normal rotation in which a signal voltage amplified through said operational amplifier is further amplified by the actuation of said operable control means and an output thus obtained is applied to one of the said igniting phase control circuits, and an operational amplifier for reverse rotation, in which a signal voltage amplified through said amplifier is further amplified by the actuation of said cutter-returning control means and an output thus obtained is transmitted to the other igniting phase control circuit.

9. Apparatus as set forth in claim 3 wherein said operable control means comprises a control circuit for controlling said DC motor, in which the igniting phase each of said two thyristors in the supply circuit of the DC motor is controlled respectively by a gate signal from said two igniting phase control circuits, said motor being driven so as to rotate in the normal direction by said operable control means or said motor being is driven to rotate reversely, reduce the reverse rotational speed or stop by means of said cutter returning control means.

10. Apparatus as set forth in claim 2 wherein said operable control means comprises a control circuit for said DC motor having a crosscurrent-detecting means which involves crosscurrent lines consisting of one line for connecting between an anode of one of said two thyristors and one terminal of the armature of said DC motor, and another line for connecting between an anode of the other of said two thyristors and the other terminal of the armature of the DC motor, a current transformer connecting between a cathode of one of two thyristors and a terminal of said armature of the DC motor, and a crosscurrent transformer connected to said line for a crosscurrent connected to an anode of the other of two thyristors; and two sets of operational amplifiers to be applied with a DC voltage lower than the DC voltage for driving the cutter through a crosscurrent-setting amplifier from another constant voltage DC power source whereby said gate signal of the phase angle coinciding with the lower DC voltage is applied through the two igniting phase control circuits to the gate of each of two sets of the thyristors so as to continuously conduct these two thyristors and the crosscurrent detected through said crosscurrent-detecting means is subjected to comparison by said crosscurrent-setting amplifier with a predetermined standard direct current voltage so as to obtain a differential voltage, which is applied to each of the two sets of the operational amplifiers, respectively.

11. Apparatus as set forth in claim 2 wherein said operable control means comprises control circuits for said DC motor which comprise two current transformers in the lines for supplying from said alternating power source to these two thyristors said transformers detecting starting current of normally rotating or reversely rotating of the DC motor, two sets of the starting current control circuits respectively supplied with thus detected current; an operational amplifier constituting a part of said DC amplifier to the input of which is applied these outputs as the correcting signals, a signal voltage obtained at the output of said operational amplifier at the start of either normal or reverse rotation is kept to a desired value.

12. Apparatus as set forth in claim 2 wherein said operable control means comprises a control circuit for the DC motor, wherein a low-ripple DC generator functioning as a rotary meter is directly coupled to the DC motor for driving the cutter, said generator inducing the DC voltage in proportion to the advancing speed of said cutter, which DC voltage is fed back through said variable resistors to an input of the operational amplifier constituting a part of the DC amplifier in such a manner that a voltage signal applied to said operational amplifier is compensated so as to obtain a signal voltage coinciding with a desired advancing speed of said cutter at the output of the operational amplifier.

13. An apparatus for automatically cutting a glass ribbon through an analogue control system which comprises a roller conveyor which advances a continuous glass ribbon formed from a molten glass mass; a guide rail bridged across and above said roller conveyor in a direction oblique to the advancing pathway of said glass ribbon; a cutter slidably mounted on said guide rail; a pulse signal generator for detecting the advancing distance of said glass ribbon; a DC motor and its control device for driving said cutter so as to move said cutter in proportion to the advancing speed of said glass ribbon to transversely cut the glass ribbon and return said cutter to its original position after the completion of cutting each glass sheet off said glass ribbon; a digital analogue circuit including a frequency counter for sampling a pulse signal detected through said pulse signal generator in proportion to the advancing speed of said glass ribbon and a converter for converting an output of said frequency counter into a direct current voltage; a control circuit of a DC motor involving amplifiers for amplifying the signal voltage, two igniting phase control circuits for receiving outputs of these amplifiers and two thyristors provided in AC supplying circuit of the DC motor in such a manner that said AC supplying circuit is conducted when the gates of said thyristors are fed with gate signals emitted from these igniting phase control circuits; a cutter travelling control means provided with a preset counter for integrating a pulse signal detected by said pulse signal generator to produce a cut-starting signal at the output whereby the output voltage of said digital analogue converting circuit is applied to said control circuit of the DC motor to normally drive said DC motor; and a cutter-returning control means including a plurality of switching means for successively transmitting instruction signals in accordance with the travel of said cutter together with the guide rail, said switching means being a adapted to apply a signal voltage by said instructions signals for the reverse rotation, reduction of the reverse rotational speed or stopping of said DC motor whereby the cutter is quickly returned back to the original position of said guide rail.

14. Apparatus for automatically cutting a glass ribbon comprising a conveyor which advances a continuous glass ribbon, a guide rail bridged across said conveyor, cutter means slidable mounted on said guide rail; a pulse signal generator for detecting the advancing speed of said glass ribbon; a DC motor for driving said cutter, operable control means for said motor whereby the latter is operable to move said cutter in proportion to the advancing speed of said glass ribbon to transversely cut the glass ribbon and return said cutter to its original position after the completion of cutting each glass sheet off said glass ribbon, and means for detecting whether the cutting faces of the glass sheets to be cut off has been in a direction perpendicular to the advancing pathway of said glass ribbon, in which a frequency counter is connected to said pulse signal generator, said detecting means being adapted to count the pulse signal counts delivered into said frequency counter within the time from the start of operation of said cutter for cutting the completion of said cutting operation.